(12) United States Patent
Chen et al.

(10) Patent No.: US 10,311,600 B2
(45) Date of Patent: Jun. 4, 2019

(54) METHOD AND SYSTEM FOR SETTING INTERFACE ELEMENT COLORS

(71) Applicant: Alibaba Group Holding Limited, George Town (KY)

(72) Inventors: Shuai Chen, Beijing (CN); Zhi Li, Beijing (CN); Tao Lin, Beijing (CN); Xushu Lu, Beijing (CN); Junlin Tian, Beijing (CN)

(73) Assignee: Alibaba Group Holding Limited (KY)

( * ) Notice: Subject to any disclaimer, the term of this patent is extended or adjusted under 35 U.S.C. 154(b) by 181 days.

(21) Appl. No.: 15/368,414

(22) Filed: Dec. 2, 2016

(65) Prior Publication Data
US 2017/0169585 A1    Jun. 15, 2017

(30) Foreign Application Priority Data

Dec. 9, 2015  (CN) .......................... 2015 1 0906885

(51) Int. Cl.
*G06T 11/00* (2006.01)
*G06F 3/0481* (2013.01)
*G06F 3/0484* (2013.01)

(52) U.S. Cl.
CPC ........ *G06T 11/001* (2013.01); *G06F 3/04817* (2013.01); *G06F 3/04842* (2013.01)

(58) Field of Classification Search
CPC .................................................... G06T 11/001
USPC ........................................................ 715/763
See application file for complete search history.

(56) References Cited

U.S. PATENT DOCUMENTS

| | | | | |
|---|---|---|---|---|
| 8,091,038 B1* | 1/2012 | Johnson | ................ | G06F 3/0481 345/207 |
| 8,145,633 B1* | 3/2012 | Manolis | ............ | G06F 17/30994 705/26.63 |
| 8,416,255 B1* | 4/2013 | Gilra | ....................... | G01J 3/526 345/593 |
| 2006/0090130 A1 | 4/2006 | Bent | | |
| 2007/0200875 A1 | 8/2007 | Seeger | | |
| 2009/0204913 A1* | 8/2009 | Kawano | .............. | G06F 3/04847 715/762 |
| 2012/0154420 A1* | 6/2012 | Calandrino | .............. | G09G 5/02 345/589 |
| 2012/0290940 A1* | 11/2012 | Quine | ....................... | G06F 8/34 715/744 |
| 2012/0291005 A1* | 11/2012 | Quine | ....................... | G06F 8/00 717/105 |
| 2012/0291006 A1* | 11/2012 | Quine | ....................... | G06F 8/00 717/105 |
| 2014/0237429 A1* | 8/2014 | Abrahami | ............. | G06T 11/001 715/835 |
| 2015/0091934 A1* | 4/2015 | Jung | ....................... | G09G 5/28 345/589 |
| 2016/0085516 A1* | 3/2016 | Ben-Tzur | .......... | G06F 17/30867 717/109 |
| 2016/0274776 A1 | 9/2016 | Scheff | | |
| 2017/0032269 A1* | 2/2017 | Portilla | .................. | G06N 7/005 |

\* cited by examiner

*Primary Examiner* — William D Titcomb
(74) *Attorney, Agent, or Firm* — Van Pelt, Yi & James LLP

(57) ABSTRACT

Setting interface element colors is disclosed including rendering an interface element, determining first color values, assigning a value to a color attribute of the interface element based on the first color values, and updating the interface element according to the assigned value.

31 Claims, 13 Drawing Sheets

100

200

METHOD AND SYSTEM FOR SETTING INTERFACE ELEMENT COLORS

CROSS REFERENCE TO OTHER APPLICATIONS

This application claims priority to People's Republic of China Patent Application No. 201510906885.6 entitled A METHOD AND A DEVICE FOR SETTING INTERFACE ELEMENT COLORS, filed Dec. 9, 2015 which is incorporated herein by reference for all purposes.

FIELD OF THE INVENTION

The present application relates to a method and a system for setting interface element colors.

BACKGROUND OF THE INVENTION

In some scenarios, a user may wish to adjust interface elements of a user terminal to display certain colors to enhance the user's experience.

However, interface elements typically do not allow the adjustment of the display of the interface elements described above. Typically, interface elements use a fixed image or colors, which are predefined and difficult to dynamically change and the interface elements display non-predefined images or colors.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Limited flexibility arises from the fact that only default color values can be assigned to color attributes of interface elements. Examples of color attributes include foreground color, background color, etc. The present application provides a process for setting interface element colors. The process can be performed by devices such as a mobile phone, a tablet computer, a personal computer, a smart television, or any appropriate user terminal with an operating system, etc. In addition, the process can also be performed by an application (app) installed on a user terminal.

Figure 1A:
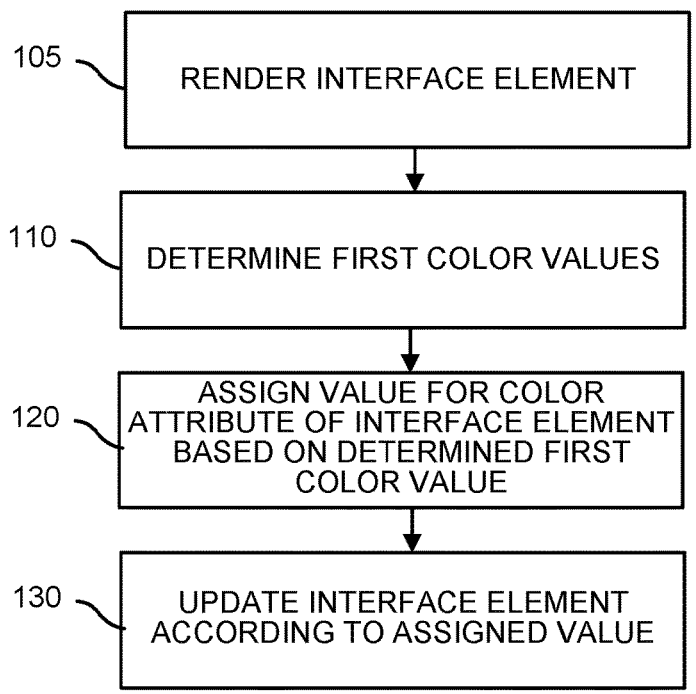
FIG. 1A is a flowchart of an embodiment of a process for setting interface element colors.

FIG. 1A is a flowchart of an embodiment of a process for setting interface element colors. In some embodiments, the process 100 is implemented by a user terminal 300 of FIG. 3 and comprises:

In 105, the user terminal renders an interface element.

In 110, the user terminal determines first color values.

In various embodiments, the user terminal determines the first color values based on the following types of information: statuses of interface elements, designated images, designated events, user-selected color values, or any combination thereof. A first color relates to a color chosen in the process. For example, when the sky is drawn, blue is chosen as the first color or base color, and when the sky is actually drawn, one shade of blue is used.

Below are examples of the determination of a first color value based on at least one of the above types of information:

Example 1. A First Color Value is Determined Based on a Status of an Interface Element Typically, the interface element refers to an interface element having a color attribute to be set. The interface elements can have different statuses. As an example, the interface element is a control "button," and the "button" can have one of three statuses: "Pressed," "Normal," and "Disabled." In some embodiments, color values corresponding separately to each of these three statuses can be preset. For example, "Pressed" is set to correspond to a color value of deep blue, "Normal" is set to correspond to a color value of light blue, and "Disabled" is set to correspond to a color value of gray.

Thus, when the current status of the "button" is "Pressed," a third party configures the color attribute of the image that is to be configured based on the deep blue color value corresponding to "Pressed." In some embodiments, the third party relates to a third party program or application which includes a button. For example, a user could directly set the deep blue-indicating color value to correspond to the color attribute value of the to-be-set image. When the user wants to set the button color to be blue, the user can set the button color to blue via an operation system configuration. In another example, the user could have the color value calculated by applying a preset color value calculation technique to the deep blue-indicating color value and set the calculated color value to be the color attribute value of the to-be-set image.

Example 2. A First Color Value is Determined Based on a Designated Image

The designated image can, for example, be any image stored locally on a user terminal. The designated image can be stored as a vectorgraph or a bitmap. For example, the default for the image is wallpaper that the user terminal is currently using, or the designated image is a certain image designated by the user.

The wallpaper can be desktop wallpaper, lock screen wallpaper, or the like.

To ensure that after the wallpaper in current use by the user terminal undergoes a change, one can relate pixel color values of the wallpaper in current use to color values of the interface elements. For example, one sets the pixel color values of the wallpaper in current use to be the same as the color values of the button.

Figure 1B:
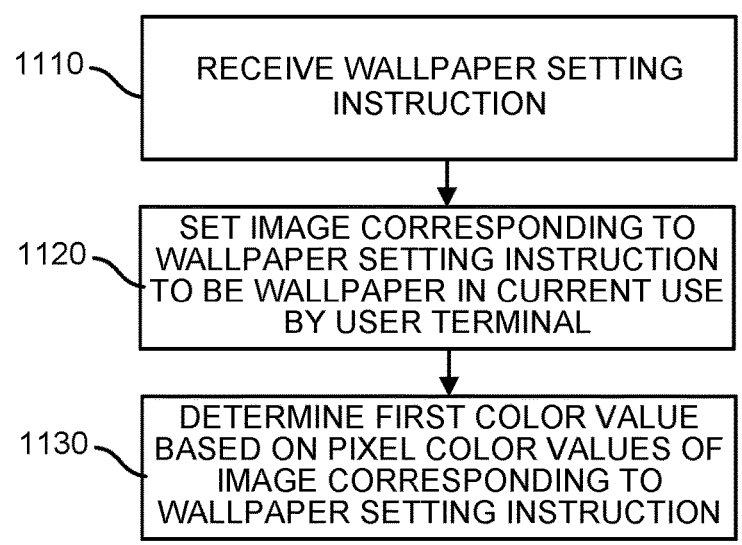
FIG. 1B is a flowchart of an embodiment of a process for determining color values.

FIG. 1B is a flowchart of an embodiment of a process for determining color values. In some embodiments, the process 1100 is an implementation of operation 110 of FIG. 1A and comprises:

In 1110, the user terminal receives a wallpaper setting instruction. The wallpaper setting instruction includes a reference (e.g., a file name and/or location, a link or a pointer to a file, etc.) to an image to be set as the wallpaper (e.g., display background) for the user terminal.

In 1120, the user terminal, in response to the receiving of the wallpaper setting instruction, sets an image corresponding to the wallpaper setting instruction to be wallpaper in current use by the user terminal.

In 1130, the user terminal determines a first color value based on pixel color values of the image corresponding to the wallpaper setting instruction.

Through process 1100, the first color value immediately after the user terminal completes the setting for the wallpaper currently in use can be determined. Furthermore, by applying operation 120 of FIG. 1A, one can relate the pixel color values of the wallpaper of the user terminal currently in use to the color value of the interface element and thus ensure that the user has a consistent visual experience. For example, when the summer weather is hot, the user uses bamboo as the desktop wallpaper, which makes the user feels cool and refreshed when looking at the desktop wallpaper. In another example, if the user opens a frequently used application having red as its main wallpaper color, the user may feel uncomfortable; however, if the frequently used application is changed to have green as its main wallpaper color, the user can feel cool and relaxed again when the frequently used application is opened. Typically, applications do not actively change their main wallpaper color.

A certain image designated by the user could, for example, be a certain image determined by the user terminal in response to receiving a specific image selection instruction. The image selection instruction could, for example, correspond to a click instruction or a gesture instruction directed at the image.

In the event that the designated image is a bitmap, pixels of the designated image have color values. The color values of the pixels can also be called pixel color values. As an example, the pixel color values can be (but are not limited to) expressed by one or more red-green-blue (RGB) arrays. For example, a set of three values can be used to represent the red, green, and blue components corresponding to a pixel. Other color formats such as YUV, YCbCr, etc., can also be used. In another example, the pixel color values can be expressed by one or more parameter values determined by an RGB array. Other color representations can be used.

In some embodiments, the first color value includes at least one color value determined based on the pixel color values of the designated image. As an example, the user terminal determines a certain pixel color value of the designated image to be the first color value. In another example, the user terminal calculates a mean value of the pixel color values of the designated image and determines the mean value to be a first color value. In yet another example, the user terminal counts pixels having different color values in the designated image and regards the color value corresponding to a maximum of the count totals as the first color value. In yet another example, the user terminal determines a pixel color value of a main hue representing the designated image and determines the pixel color value to be a first color value.

In some embodiments, the pixel color values of the designated image can be, but are not limited to, pixel color values obtained by the user terminal by sampling the color values of the pixels of the designated image.

The "dominant hue" represents the basic tendency of the color appearance. As an example, although an image uses many colors, the image is said to have a tendency with regard to the image's overall color. For example, the image tends towards blue or tends towards red. The image can tend to be warm or cool, etc. The basic tendency of a color appearance corresponds to the dominant hue of an image. Typically, the dominant hue is differentiated based on the image's warmth or coolness. "Warm dominant hues," "cool dominant hues," and "intermediate dominant hues" can exist. Typically, red, orange, and yellow represent warm hues, green, blue, and black represent cool hues, and gray, purple, and white represent intermediate hues. The brighter a cool hue is, the more the image's overall feel tends towards warmth. The brighter a warm hue is, the more the image's overall feel tends towards coolness.

Referring back to FIG. 1A, Example 3. A first color value is determined based on a designated event.

The designated event could, for example, be a time-related event, such as an arrival of a holiday or an arrival of the user's birthday. As an example, the designated event is a holiday. For the holiday, the user could choose one color to express feelings towards the holiday. In another example, the time-related event could be an event caused by the user terminal such as the receipt by the user terminal of a text message from a designated contact, payment of an order by the user terminal, acquisition by the user terminal of a forecast for a designated type of weather (such as clear or overcast), etc.

When a designated event currently exists, a color value mapping to the currently existing designated event based on mapping relationships between each designated event and a color value can be determined. The color value that is determined can serve as the first color value.

Example 4. The First Color Value is Determined Based on a User-Selected Color Value For example, a color value interface including at least two colors is displayed. Next, the appropriate color value is determined based on the user's selection of a color included in a displayed color value interface. Then the first color value is determined based on the determined appropriate color value. For example, the determined appropriate color value is directly determined as the first color value.

In 120, the user terminal assigns a value for a color attribute of an interface element based on the determined first color value. The assignment can be done via the operating system.

In 130, the user terminal updates the interface element according to the assigned value.

Typically, an interface element has various attributes related to display effects. Examples of the various attributes include color attributes, transparency attributes, brightness attributes, etc. The user terminal, by using attribute values to assign values to the attributes related to the display effects, can cause the interface element to have the display effects corresponding to the attributes when the interface element is being displayed.

In some embodiments, the assigning of the values to the interface element attributes that are related to display effects can include, but is not limited to, the assigning of values to attributes of an image that is used as an interface element background image. The size and shape of the image can be set based on the expected display effects of the interface elements. The image can be a bitmap or a vectorgraph. The image can have texture features, shape features, and/or other appropriate features.

In some embodiments, the user terminal assigns a value for an interface element color attribute based on a first color value, which was determined based on the designated image. By relating the interface element color attribute to the first color value that was determined, the user's wishes can be met to flexibly set the interface element color based on individual preference. For example, the first color value is determined based on the designated image, and when the designated image is the wallpaper currently in use by the user terminal, by relating the interface element color to the color of the wallpaper currently in use, color coordination of the interface element with the wallpaper currently in use can be ensured, thus providing the user with a consistent and aesthetically pleasing visual effect.

In some embodiments, where the interface element has different statuses, the assignment of values to color attributes for such an interface element is based on the first color value that was determined and comprises: the color attributes to an interface element having a first status are assigned based on the first color value that was determined. For example, a first color, such as red, is used to generate a set of color. If an interface element is to be emphasized, the interface element can use a strong red color. In other words, although the main color is red, different shades of red colors can be used to indicate other statuses. Using the above example of the control "button" having the three statuses of "Pressed," "Normal" and "Disabled," an assignment of a value to the color attribute of the "button" when the "button" has one of the three statuses is based on the determined first color value. In another example, a color value is assigned for a function icon when a function associated with the function icon has an "on" status, and a different color value is assigned for the functional icon when its associated function has an "off" status. Function icons, for example, can include at least one of the following: Bluetooth switch icons, wireless network switch icons, airplane mode switch icons, and other such function icons. For example, a network connectivity icon can be assigned a color value associated with green when the associated network connection is on, and the network connectivity icon can be assigned a color value associated with red when the network connection is off. Displaying an interface element in different states with corresponding color values allows the user to determine the state of an application or function by mere visual inspection, without having to navigate to a particular menu or setting to make the determination. Thus, system resources are conserved and usability is improved. Furthermore, the color can automatically change based on specific events, such as a wallpaper change, and the user does not need to manually perform the color change.

Based on the first color value, a value can be assigned to a color attribute of a first interface element or to the color attribute of multiple interface elements. The number of interface elements to be assigned the color attribute value is arbitrary and depends on implementation.

Figure 1C:
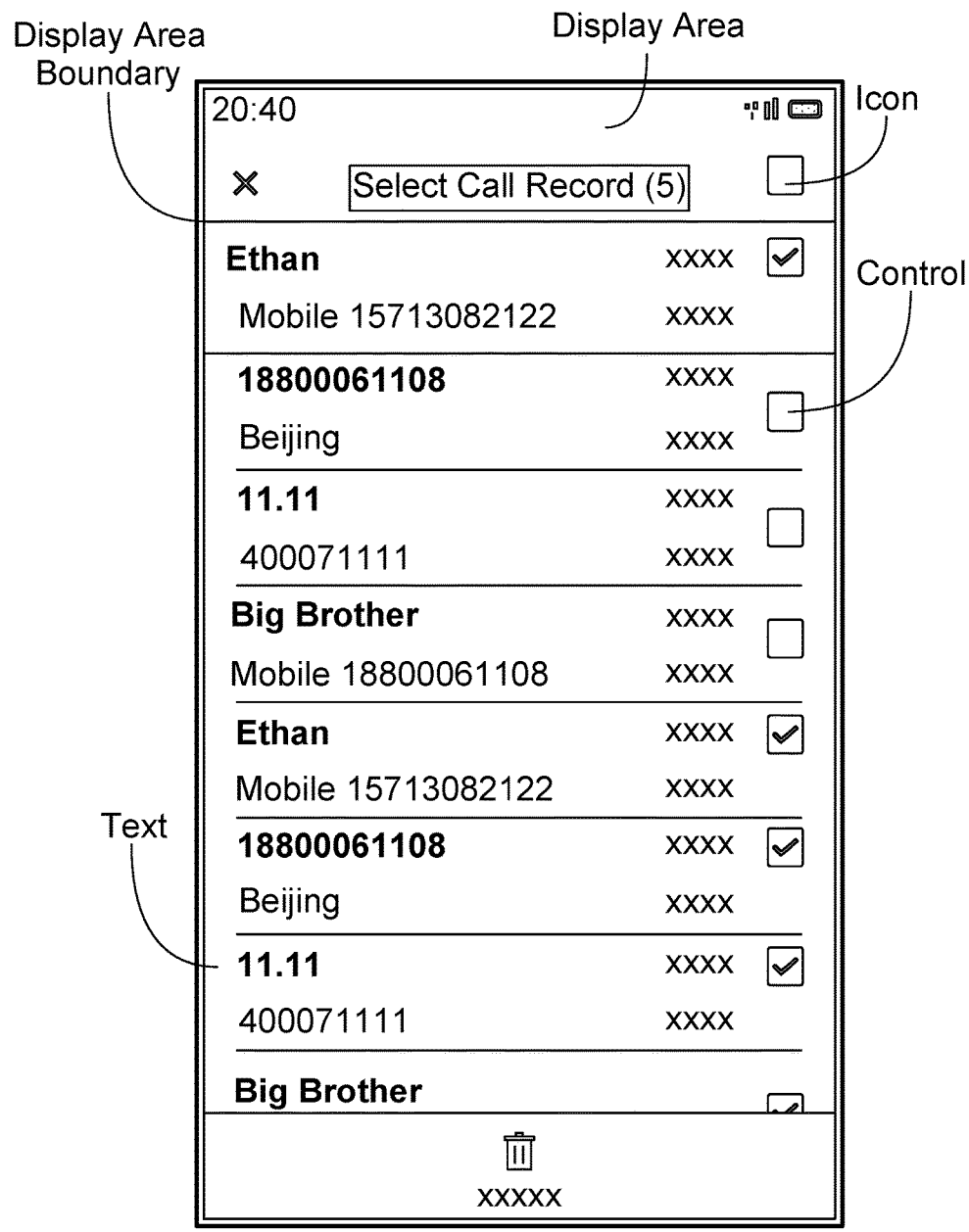
FIG. 1C is an illustration of an embodiment of icons, text, controls, display area borders, and display areas included in an interface.

FIG. 1C is an illustration of an embodiment of icons, text, controls, display area borders, and display areas included in an interface. The interface elements of the interface can include at least one of the following: icons, text, controls, display area boundaries, display areas, or the like.

The interface elements can be interface elements of basic apps, interface elements of third party apps, or a combination thereof. The "basic apps" refer to the user terminal's operating system and standard, pre-loaded apps that come with the operating system. The "third party apps" refer to apps other than the basic apps installed on the user terminal. In the event that the interface elements are the interface elements of basic apps, the user terminal typically can invoke a system interface to assign values to color attributes of the interface elements of the system app based on first color values. In the event that the interface elements are the interface elements of the third party apps, the user terminal can invoke a third party interface to the user terminal's operating system to assign values to color attributes of the interface elements of the third party app based on the first color values.

In some embodiments, after the first color values are determined by performing operation 110 of FIG. 1A, based on the first color values, values to the color attributes of interface elements of native apps are assigned.

In some embodiments, prior to performing operation 120, the user terminal receives an app selection instruction that includes a reference to an app (e.g., name, location, link, etc.), and in response to receiving the instruction, determines that the selected app is to serve as an app whose colors are to be adjusted. Thus, an example of an implementation of operation 120 includes: the user terminal assigns (via the operating system) values to color attributes of at least one interface element of the app whose colors are to be adjusted.

In some embodiments, the assigning of the values to the color attributes of the interface elements based on the first color values, for example, includes: assigning the first color values to the color attributes of the interface elements; or determining second color values mapping to the first color values, and assigning values to color attributes of the interface elements based on the determined second color values.

In some embodiments, a preset quantity of color value sets can be set up. Moreover, mapping relationships can be established between each color value set and different color value ranges (first mapping relationships). Each color value set separately includes at least one color value: color values included in each color value set correspond to the above second color values. The collection of color value sets can be referred to as a system guideline color spectrum. Based on the system guideline color spectrum, operation 120 can include determining color value ranges into which the first color values fall based on the first color values and the different color value ranges.

In some embodiments, the color value sets mapped from the color value range into which the first color values fall are determined from within the system guideline spectrum based on the first mapping relationships.

In some embodiments, values are assigned to color attributes of interface elements based on color values in the color value sets that were determined in the previous operation (operation 120).

In some embodiments, values of color attributes of one interface element or values of color attributes of two or more interface elements can be assigned based on the color values in the sets of color values that were determined. In the event that a color value set that was determined includes one color value, the color value can be assigned to one or more interface elements. In the event that the color value set that was determined includes two or more color values, the two or more color values included in the color value set can be separately assigned to two or more corresponding interface elements.

To enable coordination between the colors of different interface elements in an interface, and thus to improve the ease of use and provide a better visual experience, after setting the color value sets, the mapping relationships between the different color values in the color value sets and categories of interface elements (second mapping relationships) can be established. Based on the second mapping relationships, and after the color value sets mapped from the color value ranges into which the first color values fall are determined from within the system guideline spectrum based on the first mapping relationships, the interface element categories that separately map to different color values in the previously determined color value sets are determined, and thus the different color values in a determined color value set to the interface elements of the corresponding categories, respectively, can be determined. For example, color value A in a determined color value set X is assigned to the interface elements in the "Control" category. As an example, the main color is green (A) in a green color value set (X), and the main color A is chosen as the Control color. In another example, color value B in the determined color value set X is assigned to the interface elements in the "Icon" category.

Figure 1D:
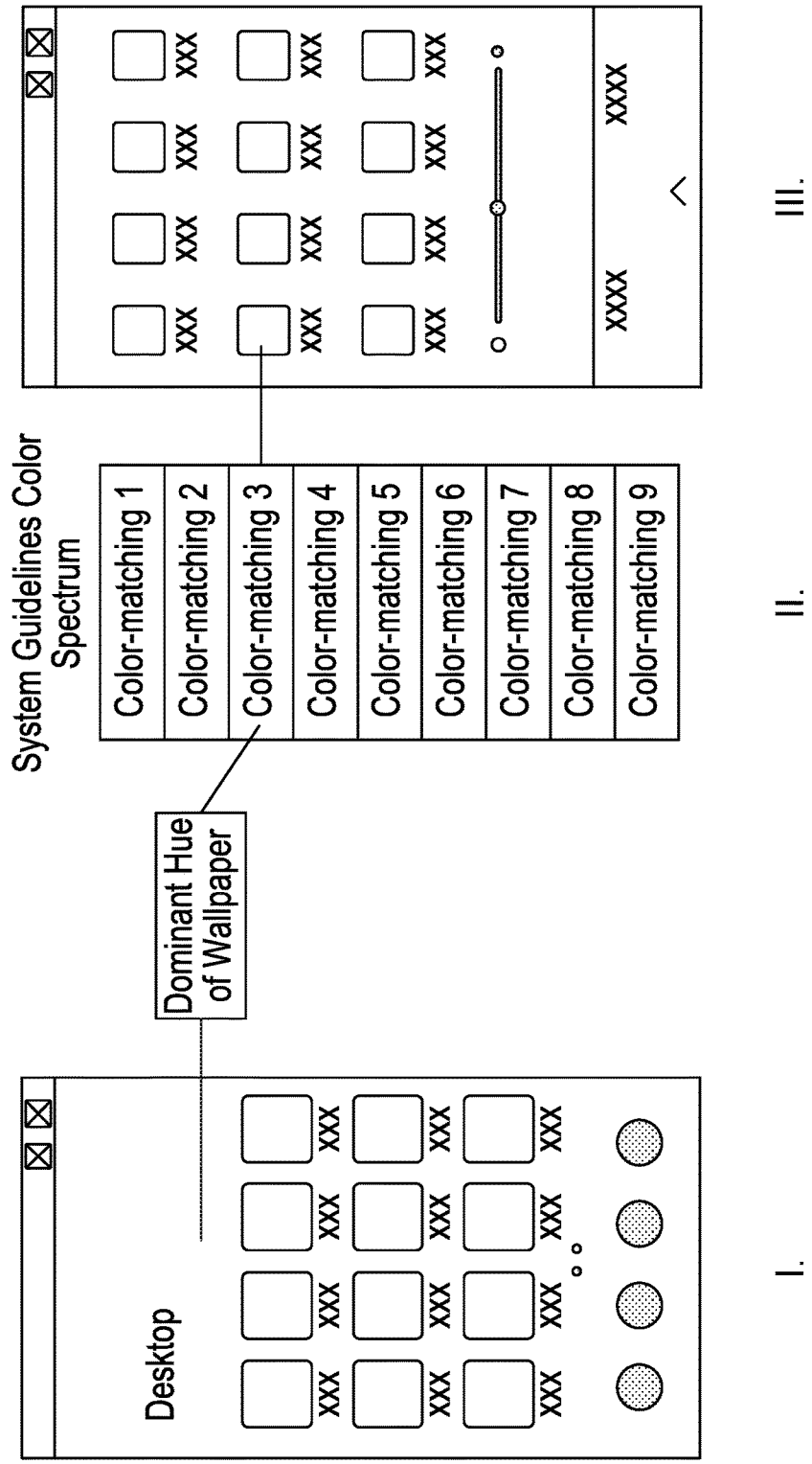
FIG. 1D is a diagram of an embodiment illustrating a process for assigning color values to interface element color attributes.

As an example: the first color value is the color value of a dominant hue of a desktop wallpaper in current use by the user terminal, and the system guideline color spectrum includes nine sets of color-matching schemes. FIG. 1D is a diagram illustrating an embodiment of a process for assigning color values to interface element color attributes.

The box (Numeral I) on the left side of FIG. 1D represents a user terminal desktop before values are assigned to color attributes of interface elements based on the first color values. The desktop makes use of wallpaper. The wallpaper is the desktop wallpaper in current use by the user terminal. In some embodiments, the color value of a dominant hue used to represent the wallpaper as the first color value can be determined by analyzing the color value, e.g., the RGB value, YUV value, and the like.

The box (Numeral II) in the middle of FIG. 1D is a diagram of nine color-matching schemes included in the system guideline color spectrum. In the box in the middle of FIG. 1D, color-matches 1-9 represent the nine color-matching schemes. These nine color-matching schemes can be nine color value sets, nine color-computing techniques, etc. Given the first color or dominant hue of the wallpaper, the color-matching schemes that map to the first color value can be determined. For example, given the first color being blue, the color-matching scheme that is determined is color-matching 3 in FIG. 1D. For the first color being blue, the color-matching scheme of the 9 color-matching schemes that mostly close matches blue is chosen.

The box (Numeral III) on the right side of FIG. 1D represents an interface where interface elements are located following an assignment of values to color attributes. In some embodiments, the color attributes of an interface element in the interface can have values assigned to them based on color-matching 3.

In some embodiments, the color values in the color value sets and the interface element categories that map to the color values can be set by a user interface (UI) designer based on popular aesthetic standards. Therefore, by using different color values in a single color values set to assign values to color attributes of interface elements of the corresponding category, an interface having an interface element color-matching that conforms to popular aesthetics can be obtained and thereby ensures a good visual experience for the user.

In some embodiments, the way in which second color values are mapped to first color values can also be achieved as follows:

Calculation of the second color values can be based on the first color values and a preset color value mapping rule. For example, if the first color values are color values represented by (R, G, B) arrays, the preset color value mapping rule is (R—50, G—50, B—50). Thus, when the first color values are (128, 100, 128), the preset color value mapping rule can be used to calculate the second color values of (78, 50, 78).

Typically, a second color value can be calculated based on first color values and a color value mapping rule. Determining the second color values corresponding to different categories of interface elements can be based on the first color values and second color value-determining rules individually preset for the different categories of the interface elements (the rule can, for example, be a color value mapping rule). Values can be assigned to color attributes of the different categories of the interface elements based on the determined second color values corresponding to the different categories of the interface elements. For example, if the second color value corresponding to "control" is determined to be X (e.g., RGB (150, 50, 160)), and the second color value corresponding to "icon" is determined to be Y (e.g., RGB (200, 60, 130)), the value X can be assigned to the color attribute for "control" and the value Y can be assigned to the color attribute for "icon."

Comparing the technique for calculating the second color values based on a preset color value mapping rule to the technique for determining the second color values based on preset color value sets, one of the advantages of the former technique lies in the fact that the former technique can reduce storage space that would be taken up by the preset color value sets, while one of the advantages to the latter technique lies in the fact that the latter technique determines the second color values more efficiently. Either technique can be selected based on actual need. Of course, some embodiments can also employ other approaches in the determining of the second color values.

Figure 1E:
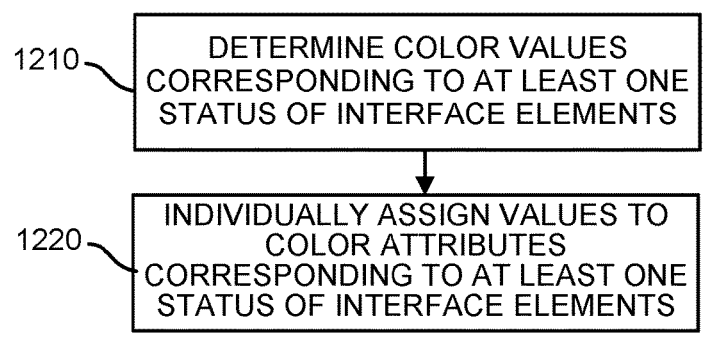
FIG. 1E is a flowchart of an embodiment of a process for assigning a color attribute of an interface element.

In some embodiments, the same interface elements have different statuses. For example, the interface element "control" has three statuses: normal, pressed (selected or pressed by the user), and disabled. In some embodiments, in view of the fact that in scenarios where interface elements have different statuses, values can be assigned to color attributes of different statuses corresponding to the interface elements. FIG. 1E is a flowchart of an embodiment of a process for assigning a color attribute of an interface element. In some embodiments, process 1200 is an implementation of 120 of process 100 and comprises:

In 1210, the user terminal determines the color values corresponding to at least one status of the interface elements based on the second color values that were determined and color value-determining rules set individually for at least one status of the interface elements.

For example, using the interface element "control" example described above, color value determining rules a, b, and c corresponding to the three "control" statuses "normal," "pressed," and "disabled" can be preset. Thus, through operation 1210, the determined second color values and the set color value determining rules a, b, and c to the color values corresponding to the three "control" statuses "normal," "pressed," and "disabled" can be used.

The color value determining rules can be a simple mapping relationship of one color value corresponding to another color value, or the color value determining rules can be a more complex calculation formula.

In 1220, the user terminal assigns values to color attributes corresponding to at least one status of the interface elements based on the color values corresponding to the at least one status of the interface elements (as determined through operation 1210).

In the above example again, when determining that the color value of the "normal" status of the "control" is Q based on the color value determining rule a, and when determining that the color value of the "pressed" status of the "control" is O based on the color value determining rule b, the Q value can be assigned to the color attribute of the "normal" status corresponding to the "control," and the O value can be assigned to the color attribute of the "pressed" status corresponding to the "control."

Operations 110 and 120 of FIG. 1A can be applied to support the assignment of different color values to the color attributes of different statuses of interface elements. Operations 110 and 120 thus achieve differentiated display of interface elements of different statuses, enabling the user to obtain increased satisfaction in the visual experience and safeguarding the user from possible erroneous applications resulting from an inability to distinguish between interface elements. Therefore, process 100 of FIG. 1A reduces system processing resources waste.

When values are being assigned to the color attributes of interface elements, values are also being assigned to interface element display effect-related attributes other than color attributes, and forms of presenting interface elements can be enriched. Therefore, in some embodiments, process 100 can further include:

Determining non-color display effects-related attribute values corresponding to the at least one status of the interface elements based on a rule for determining attribute values related to non-color display effects that are not color attribute values, and that are individually set for at least one status of interface elements.

Assigning values to attributes relating to color display effects other than those of color attribute values and corresponding to at least one status of the interface elements based on the attribute values related to the non-color display effects that were determined.

The attribute values related to the non-color display effects can include, but are not limited to at least one of the following: transparency values, brightness values, gray scale values, or the like.

In some embodiments, the timing of the performance of operation 120, for example, comes after receiving the interface element including an interface display instruction, or can be performed at some other time.

In some embodiments, an interface element has a color that reflects operating system security levels. The interface element's color could often indicate some fixed meanings. For example, when the color of a security risk level-indicating interface element is blue, that color would indicate a low security risk. When the color is red, that color would indicate a high security risk. Therefore, the color values of the interface elements are not required to be related to the first color values.

To address the above interface elements, in some embodiments, a determination can be made whether the interface elements are non-adjustable interface elements with fixed (preset) color attribute values, before assigning values to color attributes of the interface elements based on the first color values.

If a positive determination result is attained, then values cannot be assigned to color attributes of the interface elements based on the first color values. If a negative determination result is attained, then operation 120 can be performed, i.e., assign values to color attributes of interface elements based on the first color values.

In some embodiments, an identifier can be used to indicate whether the color attribute value of an interface element is adjustable or non-adjustable. A determination can be made whether the interface elements are preset interface elements that have non-adjustable color attribute values based on the identifier.

Process 100 of FIG. 1A provides an interface element color-setting technique for assigning values to the color attributes of the interface elements based on the first color values that were determined. In addition, process 100 is a highly-efficient interface element color attribute value-setting technique because the technique can support automatic adjustments to color attributes of interface elements-based user-set wallpaper, etc. This technique is more efficient than conventional approaches due to the use of the adjustments to user terminal system themes to change interface element attributes. Therefore, process 100 can conserve processing resources of user terminal processors while achieving the goal of adjusting interface element colors.

Please note that each operation in the technique provided by process 100 can be performed by the same device or executing entity, such as the same user terminal or the same server, or process 100 can also be performed by different devices as the executing entities. For example, the executing entity of operation 110 could be a user terminal, and the executing entity of operation 120 could be a server. After determining the first color values by performing operation 110, the user terminal could send the first user values to a server and thus trigger the server to perform operation 120.

Figure 2A:
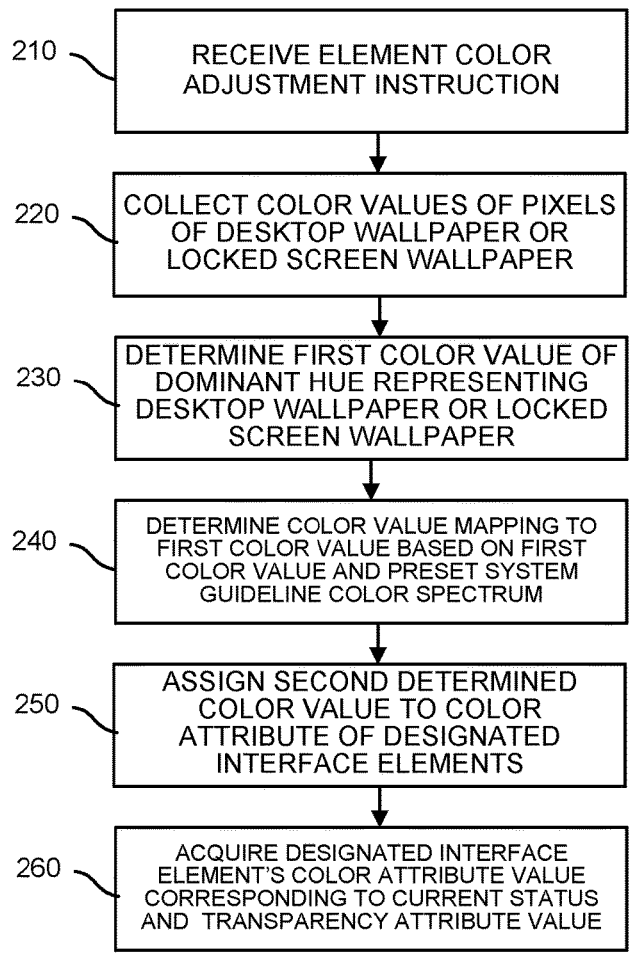
FIG. 2A is a flowchart of an embodiment of a process for displaying an interface.

FIG. 2A is a flowchart of an embodiment of a process for displaying an interface. In some embodiments, process 200 is implemented by an operating system of a mobile phone 300 of FIG. 3 and comprises:

In 210, the mobile phone receives an element color adjustment instruction.

In some embodiments, a click instruction issued by the user at a button that is displayed on a desktop and that includes the text "Interface element color adjustment" is the element color adjustment instruction. In some embodiments, the click instruction issued by the user at a "Set the image as desktop wallpaper" option or "Set the image as lock screen wallpaper" option while setting the desktop wallpaper or the lock screen wallpaper can also serve as the element color adjustment instruction.

In 220, in response to the receiving of the element color adjustment instruction, the mobile phone collects color values of pixels of desktop wallpaper or lock screen wallpaper.

In 230, the mobile phone determines a first color value of a dominant hue representing the desktop wallpaper or the lock screen wallpaper based on the collected color values of the pixels. In other words, the mobile phone determines the first color value, as described above.

In 240, the mobile phone, to obtain a second color value, determines a color value mapping to the first color value based on the first color value and a preset system guideline color spectrum. The determined first color value determines the second color value, as described above.

Figure 2B:
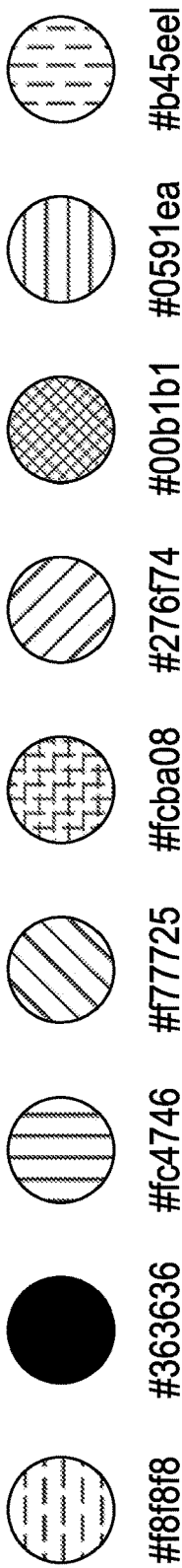
FIG. 2B is a diagram of an example of nine colors included in a preset system guideline color spectrum.

FIG. 2B is a diagram of an example of nine colors included in a preset system guideline color spectrum. For example, assume that the preset system guideline color spectrum includes the nine color values shown in FIG. 2B and that the different color values have corresponding codes, which are RGB values "#f8f8f8," "#363636," etc., respectively, as shown in FIG. 2B.

Furthermore, if we assume that the determined first color value is the color value indicating the dominant hue "white" and that the color value mapping to this color value is the color value (which is also "white") having a code in the system guideline color spectrum being "#f8f8f8," then the determined second color value is the color value having a code of "#f8f8f8."

Figure 2C:
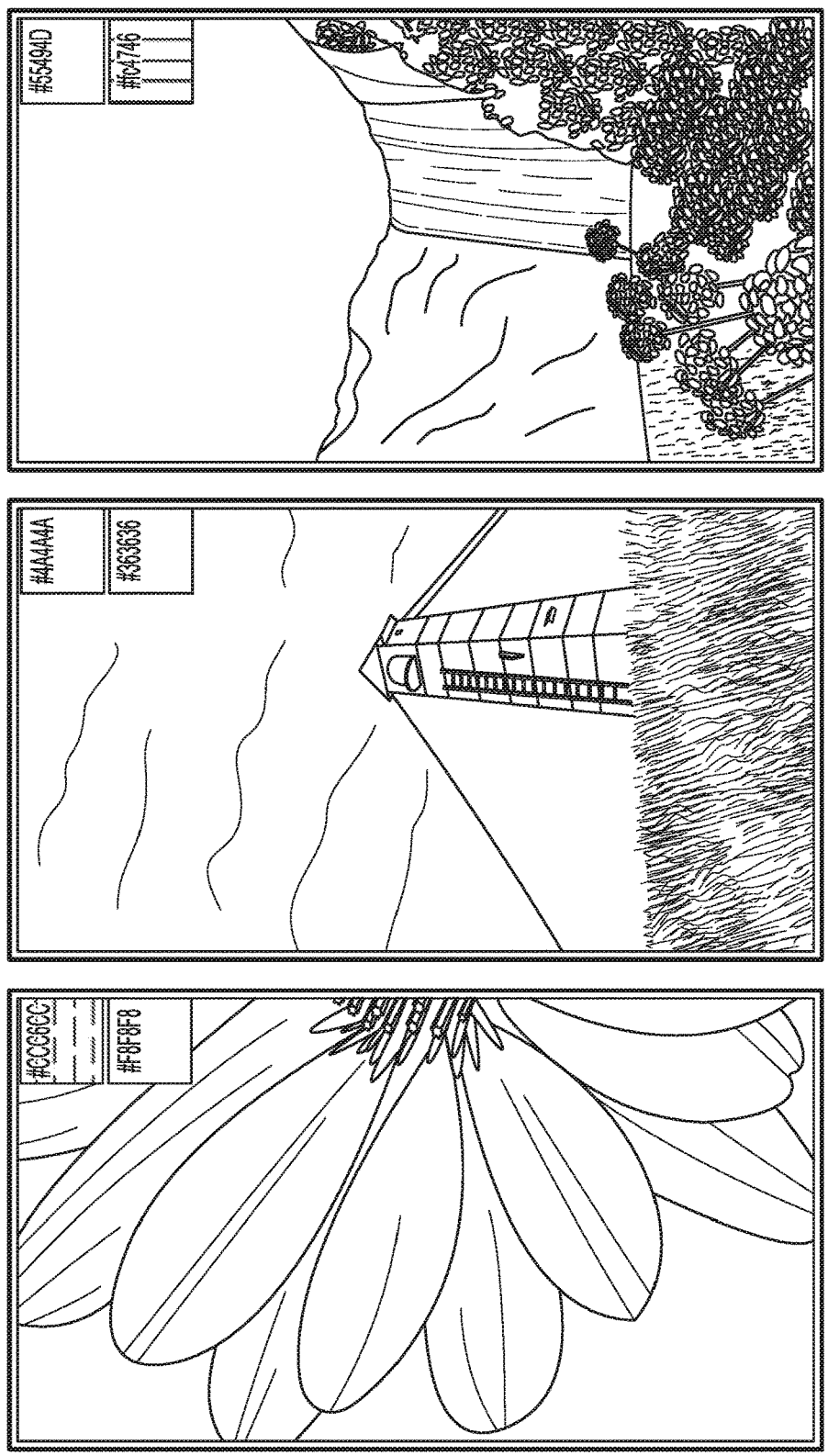
FIGS. 2C and 2D are illustrations of examples of codes for different first color values.
Figure 2D:
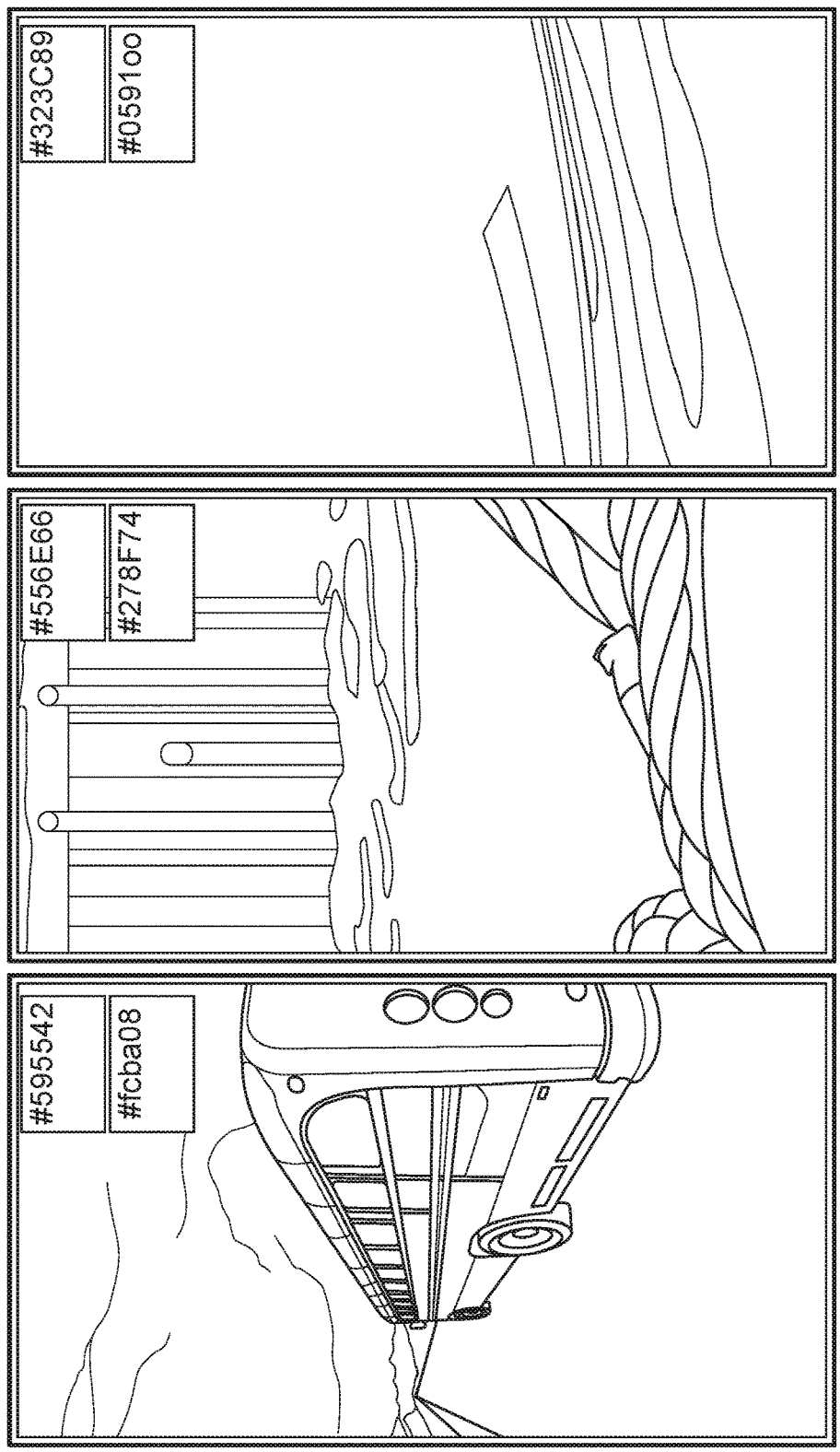

FIGS. 2C and 2D are illustrations of examples of codes for different first color values. For example, in addition to a first color value indicating that the dominant hue is white, there are also additional first color values that map to other codes in the system guideline color spectrum. Each first color value can also have a code. In some embodiments, codes of different first color values and mapping relationships between different first color values and second color values exist, as shown in FIGS. 2C and 2D.

In FIGS. 2C and 2D, each image is labeled with two corresponding boxes in the upper-right corner. The color in the upper box of the two boxes indicates the color corresponding to the dominant hue of the image. The values in the box indicate the code of the color value of the color. The color in the lower box indicates a color corresponding to the color value in the system guideline color spectrum mapping from the dominant hue in the image. The characters in the lower box indicate the code of the color value in the system guideline color spectrum. Dominant hues of different images often correspond to different colors, and each of the colors corresponding to a dominant hue of an image can be mapped to a different color value in the system guideline color spectrum.

Referring back to FIG. 2A, assume that the designated interface elements are interface elements of a basic app. In 250, the mobile phone, by invoking an operating system interface, assigns a second determined color value to a color attribute of the designated interface elements having a "normal" status.

Further, the mobile phone calculates a third color value C3 based on the color value-calculating formula that was set and assigns the third color value to the color attribute of the designated interface elements having a "pressed" status. In addition, the mobile phone optionally selects a transparency value from within a first transparency value range (e.g., [65%, 90%]) and assigns the selected transparency value to a transparency attribute of the designated interface elements having a "pressed" status.

In some embodiments, the mobile phone assigns the determined second color value to the color attribute of the designated interface elements having a "disabled" status. In addition, the mobile phone selects a transparency value from within a second transparency value range (e.g., [20%, 60%]) and assigns the selected transparency value to the transparency attribute of the designated interface elements having a "disabled" status.

In 260, when a currently occurring event that complies with the presentation conditions for a designated interface element is detected, the mobile phone acquires the designated interface element's color attribute value corresponding to the current status and the designated interface element's color attribute value's transparency attribute value based on the current status of the designated interface element. Moreover, the mobile phone renders an interface including the designated interface elements based on the acquired color attribute value and transparency attribute value, and displays the rendered interface.

When the designated interface element is a designated interface element on a desktop, a presentation condition for the designated interface element can be a condition for triggering presentation of the desktop by the mobile phone. For example, the mobile phone receives a click instruction from the user directed at a "Home" key. When the designated interface element is an icon in a pull-down notification center, the presentation condition for the interface element could be a condition for triggering the mobile phone to present the pull-down notification center. For example, the mobile phone could be receiving a user swipe instruction input through the desktop by swiping from the desktop top to the desktop bottom. The pull-down notification center can be an interface for presenting system notifications, system function switches (such as a Bluetooth switch or airplane mode switch), frequently-used apps of the user, or any combination thereof. The pull-down notification center typically has a hidden status. When the mobile phone detects the condition for presenting the pull-down notification center, the mobile phone is to present the interface.

Process 200 can assign values to color attributes of designated interface elements of a basic app based on the pixel color values of the wallpaper in current use by the user, and thus provide a flexible interface element setting technique. Process 200 thus avoids a poor flexibility arising from the inability to assign values other than default values to color attributes of the interface elements. If the designated interface element is a third party app interface element, and if the third party app opens a data access interface to the mobile phone operating system, the mobile phone can employ operations similar to the above to implement the rendering and the displaying of the third party app interface. As an example, with regard to operation 250, the mobile phone can assign values to color attributes or transparency attributes of the interface elements by invoking the data access interface.

Process 200 can support interface element color adaptive adjustments that are performed each time the wallpaper in current use (desktop wallpaper or lock screen wallpaper) is adjusted by the user. The user thus can enjoy increased satisfaction in the visual experience.

Figure 2E:
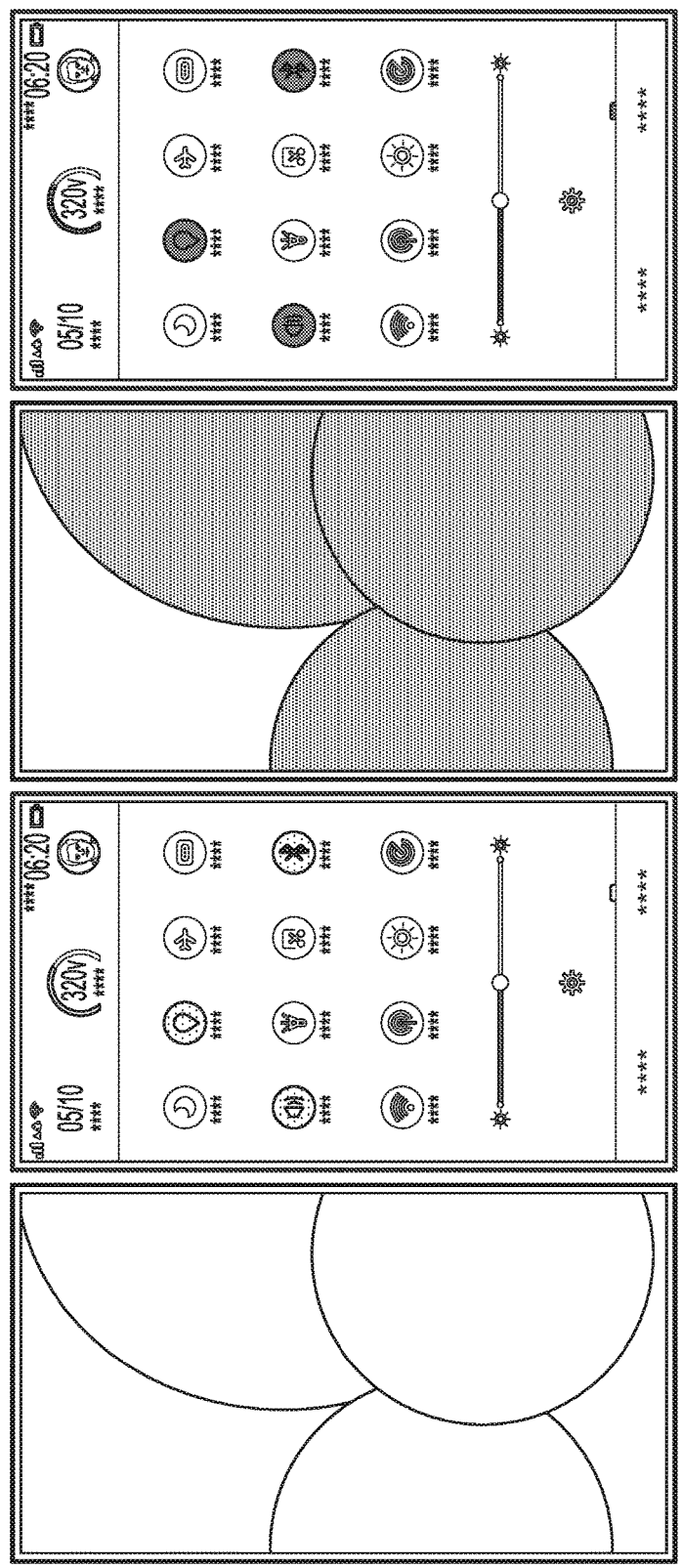
FIG. 2E includes screenshots illustrating a wallpaper changing color causing an interface element to change color.

FIG. 2E includes screenshots illustrating a wallpaper changing color causing an interface element to change color. For the pair of images on the left side of FIG. 2E, the dominant hue of the wallpaper is green and some interface elements (or buttons) also have a green dominant hue. When the dominant hue of the wallpaper changes to blue, as shown in the pair of images on the right side of FIG. 2E, the interface elements (or buttons) that had a green dominant hue change to have a blue dominant hue.

Figure 3:
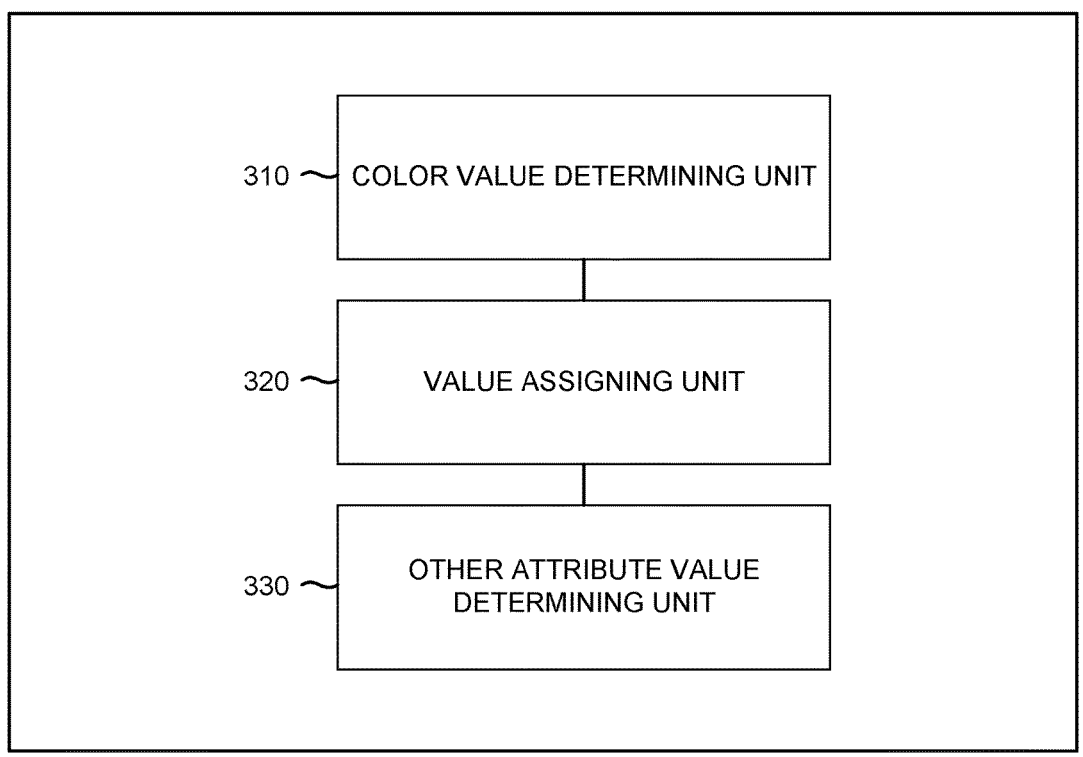
FIG. 3 is a structural diagram of an embodiment of a system for setting interface element colors.

FIG. 3 is a structural diagram of an embodiment of a system for setting interface element colors. In some embodiments, the system 300 is configured to perform process 100 of FIG. 1A and includes a color value determining unit 310 and a value assigning unit 320.

In some embodiments, the system 300 relates to a user terminal, a mobile phone, a device, or the like.

In some embodiments, the color value determining unit 310 is configured to determine first color values.

For example, the color value determining unit 310 specifically determines the first color values based on statuses of the interface elements, designated images, designated events, user-selected color values, or any combination thereof.

As an example, the color value determining unit 310 determines a first color value based on a color value of a wallpaper currently in use by the user, a color value of the image corresponding to an image selection instruction, or a combination thereof. In another example, the color value determining unit 310 determines a color value mapped from the current status of the interface element based on mapping relationships of different statuses of the interface element to color values. In yet another example, the color value determining unit 310, when a first designated event currently exists, determines color values mapping to first designated events based on the mapping relationships between various designated events and color values. In yet another example, the color value determining unit 310 displays a color value interface including at least two colors and determines the first color values based on user selected colors included in the color value interface.

In some embodiments, the value assigning unit 320 is configured to assign values to color attributes of interface elements based on the first color values determined by the color value determining unit 310.

As an example, the value assigning unit 320 assigns values to color attributes of interface elements of a first status based on the first color values determined by the color value determining unit 310.

In some embodiments, the interface elements include function icons, and the first status includes corresponding functions represented by function icons having an "on" status.

In some embodiments, the value assigning unit 320 assigns the first color values determined by the color value determining unit 310 to color attributes of the interface elements, or determines second color values mapping to the first color values determined by the color value determining unit 310, and assigns values to color attributes of the interface elements based on the determined second color values.

In some embodiments, the value assigning unit 320 determines second color values from among the second color values included in a preset second color value set based on the first color values determined by the color value determining unit 310, or calculates the second color values based on the first color values and a preset color value mapping rule.

In some embodiments, the value assigning unit 320 determines second color values corresponding to different categories of interface elements based on the first color values and second color value-determining rules individually preset for the different categories of the interface elements and assigns values to color attributes of interface elements of the different categories based on the second color values corresponding to the different categories of interface elements.

In some embodiments, to enable users to have a direct, visual understanding of the current visual status of the interface element, the value assigning unit 320 determines the color values corresponding to at least one status of the interface elements based on the second color values determined by the color value determining unit 310 and the color value determining rule for separately setting at least one status of the interface elements, and assigns values to color attributes corresponding to the at least one status of the interface elements based on the color values corresponding to the at least one status of the interface elements.

In some embodiments, to enable the user to have a direct, visual understanding of the current visual status of the interface element, the device further includes: another attribute value determining unit 330 configured to determine attribute values related to non-color display effects and corresponding to interface elements. Correspondingly, the value assigning unit 320 is further configured to assign values to attributes related to non-color display effects of the interface elements based on attribute values that are related to the non-color display effects and that were determined by the other attribute value determining unit 330.

In some embodiments, the attribute values related to non-color display effects include: transparency values, brightness values, gray scale values, or any combination thereof.

In some embodiments, when the designated images include the wallpaper in current use by the user, the color value determining unit 310 is further configured to receive a wallpaper setting instruction, in response to receiving the wallpaper setting instruction, set the image corresponding to the wallpaper setting instruction to be the wallpaper in current use by the user terminal, and determine first color values based on the pixel color values of the image corresponding to the wallpaper setting instruction.

The device 300 can also support assigning values to interface elements that satisfy a designated condition based on the first color values. For example, a value assigning unit 320 determines whether interface elements are preset, color attribute value non-adjustable interface elements prior to assigning values to color attributes of the interface elements based on the first color values, and obtains a negative assessment result.

In some embodiments, the interface elements include the following categories: icons, text, controls, display area boundaries, display areas, or any combination thereof.

In some embodiments, the interface elements are interface elements of basic apps, interface elements of third party apps, or a combination thereof.

The device 300 can assign values to color attributes of interface elements based on the determined first color values and thus provide an interface element color-setting technique. In addition, the technique is a highly-efficient interface element color attribute value-setting technique, because the technique can support automatic adjustments to color attributes of interface elements-based user-set wallpaper, etc. This technique is more efficient than conventional approaches, namely changing interface element attributes based on the adjustments to user terminal system themes. Therefore, the technique can conserve processing resources of user terminal processors while adjusting interface element colors.

The units described above can be implemented as software components executing on one or more general purpose processors, as hardware such as programmable logic devices and/or Application Specific Integrated Circuits designed to perform certain functions, or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units or units.

The methods or algorithmic steps described in light of the embodiments disclosed herein can be implemented using hardware, processor-executed software units, or combinations of both. Software units can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 4:
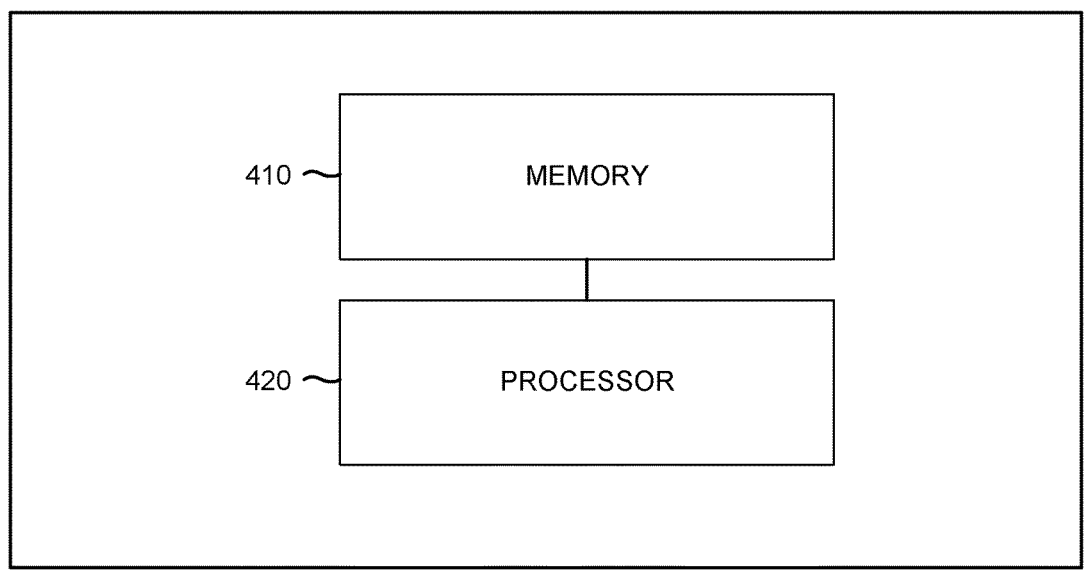
FIG. 4 is a structural diagram of an embodiment of a smart device for setting interface element colors.

FIG. 4 is a structural diagram of an embodiment of a smart device for setting interface element colors. In some embodiments, the smart device 400 includes: memory 410 and a processor 420.

In some embodiments, the memory 410 is configured to store computer program instructions.

In some embodiments, the processor 420 coupled to the memory is configured to read computer instructions stored in the memory, and execute the following operations: determining first color values; and assigning values to color attributes of interface elements based on the first color values.

In some embodiments, the processor assigns values to color attributes of interface elements having a first status.

In some embodiments, the interface elements include function icons, and the first status includes the corresponding functions represented by the function icons having an "on" status.

In some embodiments, the processor determines first color values based on statuses of the interface elements, designated images, designated events, user-selected color values, or any combination thereof.

As an example, the processor determines, based on pixel color values of a designated image, the color value of a dominant hue used to represent the designated image as the first color value. In another example, the processor determines the color value mapped from the current status of the interface element as the first color value based on the mapping relationships of different statuses of the interface element to color values. In yet another example, the processor, when a first designated event currently exists, determines the color values mapping to first designated events based on the mapping relationships between various designated events and color values to be the first color values. In yet another example, the processor displays a color value interface including at least two colors and determines first color values based on selections made by the user of colors included in the color value interface.

To assign values to color attributes of the interface elements, the processor, for example, assigns the first color values to the color attributes of the interface elements; or determines second color values mapping to the first color values, and assigns values to the color attributes of the interface elements based on the determined second color values.

In some embodiments, the processor determines second color values from among the second color values included in a preset second color value set based on the first color values, or calculates the second color values based on the first color values and a preset color value mapping rule.

In some embodiments, the processor determines second color values corresponding to different categories of the interface elements based on the first color values and second color value-determining rules individually preset for the different categories of the interface elements and assigns values to color attributes of the interface elements of the different categories based on the second color values corresponding to the different categories of the interface elements.

In some embodiments, the processor determines the color values corresponding to at least one status of the interface elements based on the determined second color values and the color value determining rule for separately setting at least one status of the interface element, and assigns values to color attributes corresponding to the at least one status of the interface element based on the color values corresponding to the at least one status of the interface element.

The smart device can also assign values to attributes related to non-color display effects and corresponding to the interface elements. As an example, the processor in the smart device can also determine the attribute values related to the non-color display effects and corresponding to the interface elements, and assign values to attributes related to the non-color display effects of the interface elements based on the attribute values that are related to the non-color display effects and that were determined by the other attribute value determining unit.

The attribute values related to the non-color display effects can include transparency values, brightness values, gray scale values, or any combination thereof.

With the above smart device 400, first color values to assign values to color attributes of interface elements can be determined and thus an interface element color-setting technique can be provided. In addition, the technique is a highly-efficient interface element color attribute value-setting technique because the technique can support automatic adjustments to color attributes of interface elements-based user-set wallpaper, etc. This technique is more efficient than the conventional approaches, namely changing interface element attributes based on adjustments to user terminal system themes. Therefore, the technique can conserve processing resources of user terminal processors while adjusting interface element colors.

Figure 5:
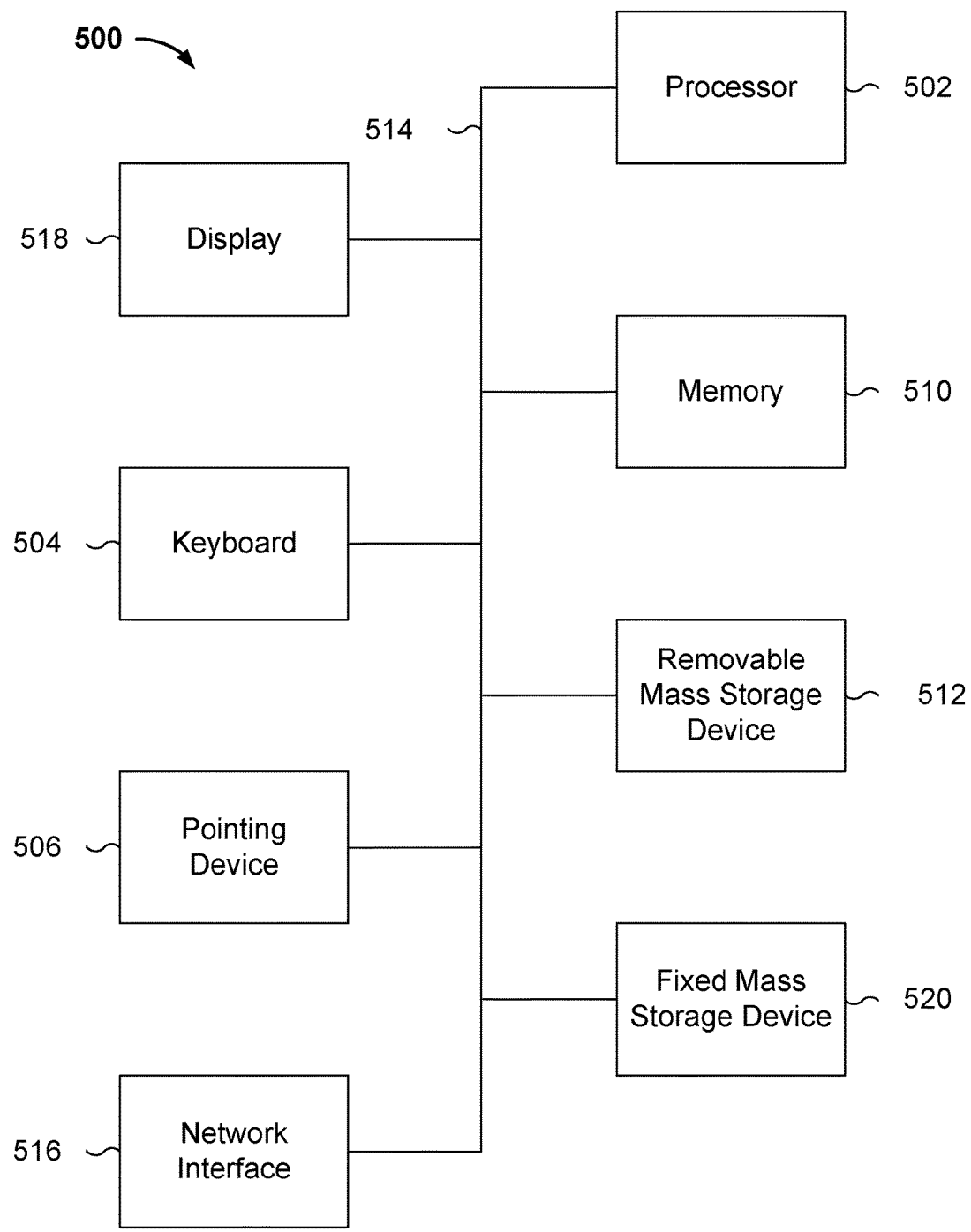
FIG. 5 is a functional diagram illustrating an embodiment of a programmed computer system for setting interface element colors.

FIG. 5 is a functional diagram illustrating an embodiment of a programmed computer system for setting interface element colors. As will be apparent, other computer system architectures and configurations can be used to set interface element colors. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or unidirectional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storages 512, 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for setting interface element colors, comprising:
    rendering an interface element to be displayed on a mobile device, the interface element corresponding to an interface element of an application;
    determining first color values, wherein the determining of the first color values comprises:
        performing one or more of the following:
            determining the first color values based on a status of the interface element, the status corresponding to pressed, normal, or disabled;
            determining the first color values based on a designated image, the designated image corresponding to desktop wallpaper, lock screen wallpaper, or both; or
            determining the first color values based on a designated event, the designated event relating to a time-related event;
    assigning a value to a color attribute of the interface element based on the first color values; and
    updating the interface element according to the assigned value.

2. The method as described in claim 1, wherein the assigning of the value to the color attribute of the interface element comprises:
    assigning a first value to a first color attribute of the interface element having a first status.

3. The method as described in claim 1, wherein:
the assigning of the value to the color attribute of the interface element comprises:
assigning a first value to a first color attribute of the interface element having a first status;
the interface element includes: a function icon; and
the first status includes an on or off status associated with a corresponding function represented by the function icon.

4. The method as described in claim 1, wherein the assigning of the value to the color attribute of the interface element comprises:
assigning a first color value to the color attribute of the interface element; or
determining second color values mapping to the first color values, and assigning the value to the color attribute of the interface element based on the determined second color values.

5. The method as described in claim 1, wherein:
the assigning of the value to the color attribute of the interface element comprises:
assigning a first color value to the color attribute of the interface element; or
determining second color values mapping to the first color values, and assigning the value to the color attribute of the interface element based on the determined second color values; and
the determining of the second color values mapping to the first color values comprises:
determining the second color values from among second color values included in a preset second color value set based on the first color values; or
calculating the second color values based on the first color values and a preset color value mapping rule.

6. The method as described in claim 1, wherein:
the assigning of the value to the color attribute of the interface element comprises:
assigning a first color value to the color attribute of the interface element; or
determining second color values mapping to the first color values, and assigning the value to the color attribute of the interface element based on the determined second color values;
the determining of the second color values mapping to the first color values comprises:
determining the second color values corresponding to different categories of interface elements based on the first color values and second color value-determining rules individually preset for the different categories of the interface elements; and
the assigning of the value to the color attribute of the interface element based on the determined second color values comprises:
assigning values to color attributes of the different categories of the interface elements based on the second color values corresponding to the different categories of the interface elements.

7. The method as described in claim 1, wherein:
the assigning of the value to the color attribute of the interface element comprises:
assigning a first color value to the color attribute of the interface element; or
determining second color values mapping to the first color values, and assigning the value to the color attribute of the interface element based on the determined second color values; and
the assigning of the value to the color attribute of the interface element based on the determined second color values comprises:
determining at least one color value corresponding to at least one status of the interface element based on the second color values that were determined and color value-determining rules set individually for the at least one status of the interface element; and
individually assigning values to at least one color attribute corresponding to the at least one status of the interface element based on the at least one color value corresponding to the at least one status of the interface element.

8. The method as described in claim 1, further comprising:
determining an attribute value related to a non-color display effect and corresponding to the interface element; and
assigning a value to the attribute related to the non-color display effect of the interface element based on the determined attribute value related to the non-color display effect.

9. The method as described in claim 1, further comprising:
determining an attribute value related to a non-color display effect and corresponding to the interface element; and
assigning a value to the attribute related to the non-color display effect of the interface element based on the determined attribute value related to the non-color display effect, wherein the attribute value related to the non-color display effect includes a transparency value, a brightness value, a gray scale value, or any combination thereof.

10. The method as described in claim 1, wherein the determining of the first color values comprises:
determining the first color values based on the designated image, comprising:
determining the first color values based on a color value of wallpaper in current use by a user terminal, a color value of an image corresponding to an image selection instruction, or a combination thereof.

11. The method as described in claim 1, wherein the determining of the first color values comprises:
determining the first color values based on the designated image, comprising:
determining the first color values based on a color value of wallpaper in current use by a user terminal, a color value of an image corresponding to an image selection instruction, or a combination thereof, comprising:
determining color values used to represent a dominant hue of the designated image based on a pixel color value of the designated image.

12. The method as described in claim 1, wherein the determining of the first color values comprises:
determining the first color values based on the designated image, comprising:
determining the first color values based on color values of wallpaper in current use by a user terminal, comprising:
receiving a wallpaper setting instruction;
in response to the receiving of the wallpaper setting instruction, setting an image corresponding to the wallpaper setting instruction to be the wallpaper in current use by the user terminal; and
determining the first color values based on pixel color values of the image corresponding to the wallpaper setting instruction.

13. The method as described in claim 1, wherein the determining of the first color values comprises:
  determining the first color values based on the status of the interface element, comprising:
    determining a color value mapped from the status of the interface element based on mapping relationships between different statuses of interface elements and color values.

14. The method as described in claim 1, wherein the determining of the first color values comprises:
  determining the first color values based on the designated event, comprising:
    in the event that a first designated event currently exists, determining a color value mapping to the currently existing first designated event based on mapping relationships between various designated events and color values.

15. The method as described in claim 1, wherein the determining of the first color values comprises:
  determining the first color values based on the designated event, comprising:
    displaying a color value interface including at least two colors; and
    determining the first color values based on a user's selection of a color included in the color value interface.

16. The method as described in claim 1, further comprises:
  prior to the assigning of the value to the color attribute of the interface element:
    determining whether the interface element is a preset interface element having a non-adjustable color attribute value; and
    in the event that the interface element is the preset interface element having the non-adjustable color attribute value, obtaining a negative assessment result.

17. The method as described in claim 1, wherein the interface element includes an icon, a text, a control, a display area boundary, a display area, or any combination thereof.

18. A system for setting interface element colors, comprising:
  a processor; and
  a memory coupled with the processor, wherein the memory is configured to provide the processor with instructions which when executed cause the processor to:
    render an interface element to be displayed on a mobile device, the interface element corresponding to an interface element of an application;
    determine first color values, wherein the determining of the first color values comprises to:
      perform one or more of the following:
        determine the first color values based on a status of the interface element, the status corresponding to pressed, normal, or disabled;
        determine the first color values based on a designated image, the designated image corresponding to desktop wallpaper, lock screen wallpaper, or both; or
        determine the first color values based on a designated event, the designated event relating to a time-related event;
    assign a value to a color attribute of the interface element based on the first color values; and
    update the interface element according to the assigned value.

19. The system as described in claim 18, wherein the assigning of the value to the color attributes of the interface element comprises to:
  assign a first value to a first color attribute of the interface element having a first status.

20. The system as described in claim 18, wherein:
  the assigning of the value to the color attribute of the interface element comprises to:
    assign a first value to a first color attribute of the interface element having a first status;
  the interface element includes: a function icon; and
  the first status includes an on or off status associated with a corresponding function represented by the function icon.

21. The system as described in claim 18, wherein the assigning of the value to the color attribute of the interface element comprises to:
  assign a first color value to the color attribute of the interface element; or
  determine second color values mapping to the first color values, and assign the value to the color attribute of the interface element based on the determined second color values.

22. The system as described in claim 18, wherein:
  the assigning of the value to the color attribute of the interface element comprises to:
    assign a first color value to the color attribute of the interface element; or
    determine second color values mapping to the first color values, and assign the value to the color attribute of the interface element based on the determined second color values; and
  the determining of the second color values mapping to the first color values comprises to:
    determine the second color values from among second color values included in a preset second color value set based on the first color values; or
    calculate the second color values based on the first color values and a preset color value mapping rule.

23. The system as described in claim 18, wherein:
  the assigning of the value to the color attribute of the interface element comprises to:
    assign a first color value to the color attribute of the interface element; or
    determine second color values mapping to the first color values, and assign the value to the color attribute of the interface element based on the determined second color values;
  the determining of the second color values mapping to the first color values comprises to:
    determine the second color values corresponding to different categories of interface elements based on the first color values and second color value-determining rules individually preset for the different categories of the interface elements; and
  the assigning of the value to the color attribute of the interface element based on the determined second color values comprises to:
    assign values to color attributes of the different categories of the interface elements based on the second color values corresponding to the different categories of the interface elements.

24. The system as described in claim 18, wherein:
  the assigning of the value to the color attribute of the interface element comprises to:
    assign a first color value to the color attribute of the interface element; or determine second color values mapping to the first color values, and assigning the value to the color attribute of the interface element based on the determined second color values; and the assigning of the value to the color attribute of the interface element based on the determined second color values comprises to:

determine at least one color value corresponding to at least one status of the interface element based on the second color values that were determined and color value-determining rules set individually for the at least one status of the interface element; and individually assign values to at least one color attribute corresponding to the at least one status of the interface element based on the at least one color value corresponding to the at least one status of the interface element.

25. The system as described in claim 18, wherein the processor is further configured to:

determine an attribute value related to a non-color display effect and corresponding to the interface element; and assign a value to the attribute related to the non-color display effect of the interface element based on the determined attribute value related to the non-color display effect.

26. The system as described in claim 18, wherein the processor is further configured to:

determine an attribute value related to a non-color display effect and corresponding to the interface element; and assign a value to the attribute related to the non-color display effect of the interface element based on the determined attribute value related to the non-color display effect, wherein the attribute value related to the non-color display effect includes a transparency value, a brightness value, a gray scale value, or any combination thereof.

27. The system as described in claim 18, wherein the determining of the first color values comprises to:

determine the first color values based on the designated image, comprising to:

determine the first color values based on a color value of wallpaper in current use by a user terminal, a color value of an image corresponding to an image selection instruction, or a combination thereof, comprising to:

determine color values used to represent a dominant hue of the designated image based on a pixel color value of the designated image.

28. The system as described in claim 18, wherein the determining of the first color values comprises to:

determine the first color values based on the status of the interface element, comprising to:

determine a color value mapped from the status of the interface element based on mapping relationships between different statuses of interface elements and color values.

29. The system as described in claim 18, wherein the determining of the first color values comprises to:

determine the first color values based on the designated event, comprising to:

in the event that a first designated event currently exists, determine a color value mapping to the currently existing first designated event based on mapping relationships between various designated events and color values.

30. The system as described in claim 18, wherein the determining of the first color values comprises to:

determine the first color values based on the designated event, comprising to:

display a color value interface including at least two colors; and determine the first color values based on a user's selection of a color included in the color value interface.

31. A computer program product for setting interface element colors, the computer program product being embodied in a tangible non-transitory computer readable storage medium and comprising computer instructions for:

rendering an interface element to be displayed on a mobile device, the interface element corresponding to an interface element of an application;

determining first color values, wherein the determining of the first color values comprises:

performing one or more of the following:

determining the first color values based on a status of the interface element, the status corresponding to pressed, normal, or disabled;

determining the first color values based on a designated image, the designated image corresponding to desktop wallpaper, lock screen wallpaper, or both; or determining the first color values based on a designated event, the designated event relating to a time-related event;

assigning a value to a color attribute of the interface element based on the first color values; and updating the interface element according to the assigned value.

* * * * *